:=

US009380524B2

(12) United States Patent
Kotreka et al.

(10) Patent No.: US 9,380,524 B2
(45) Date of Patent: Jun. 28, 2016

(54) ENHANCED CALL RECORDING FOR DUAL-SIM DUAL-ACTIVE WIRELESS COMMUNICATION DEVICES

(71) Applicant: QUALCOMM Incorporated, San Diego, CA (US)

(72) Inventors: Ravi Kanth Kotreka, Hyderabad (IN); Pavan Kumar Kadiyala, Hyderabad (IN); Ramlal Karra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/281,511

(22) Filed: May 19, 2014

(65) Prior Publication Data

US 2015/0334641 A1    Nov. 19, 2015

(51) Int. Cl.
*H04B 1/3816*    (2015.01)
*H04M 1/64*    (2006.01)
*H04W 48/18*    (2009.01)
*H04M 1/65*    (2006.01)
*H04M 1/656*    (2006.01)

(52) U.S. Cl.
CPC ............. *H04W 48/18* (2013.01); *H04M 1/65* (2013.01); *H04M 1/656* (2013.01); *H04M 2250/62* (2013.01)

(58) Field of Classification Search
CPC ... H04B 1/3816; H04M 2250/14; H04M 1/64
USPC .......................................................... 455/558
See application file for complete search history.

(56) References Cited

U.S. PATENT DOCUMENTS

| 7,912,497 | B2 | 3/2011 | Isidore et al. |
| 8,189,745 | B2 * | 5/2012 | Kuhl .............. H04M 1/656 |
| | | | 379/207.01 |
| 2006/0234693 | A1 | 10/2006 | Isidore et al. |
| 2010/0190526 | A1 | 7/2010 | Marks |
| 2010/0210304 | A1 | 8/2010 | Huslak |
| 2014/0038666 | A1 | 2/2014 | Chin et al. |
| 2015/0050913 | A1 * | 2/2015 | Liang ............ H04W 12/12 |
| | | | 455/410 |

FOREIGN PATENT DOCUMENTS

| CN | 100334909 C | 8/2007 | |
| IN | WO 2012094428 A1 * | 7/2012 | ............ H04W 68/02 |
| WO | 2012094428 A1 | 7/2012 | |

OTHER PUBLICATIONS

International Search Report and Written Opinion for PCT/US2015/022400 dated May 22, 2015, 9 pgs.
Written Opinion of the International Preliminary Examining Authority—PCT/US2015/022400—May 3, 2016—6 Pages.

* cited by examiner

*Primary Examiner* — Sharad Rampuria
*Assistant Examiner* — Farideh Madani
(74) *Attorney, Agent, or Firm* — Procopio, Cory, Hargreaves & Savitch LLP

(57) ABSTRACT

A multi-Subscriber Identity Module (SIM) wireless communication device includes: a first communications unit; a second communications unit; a recording unit; and a control unit configured to cause the first communications unit to interrupt output of a first audio output signal to a sound reproduction device and conduct a first decoded audio signal to the recording unit; and the control unit configured to cause the second communications unit to output a second audio output signal to the sound reproduction device.

17 Claims, 6 Drawing Sheets

ENHANCED CALL RECORDING FOR DUAL-SIM DUAL-ACTIVE WIRELESS COMMUNICATION DEVICES

BACKGROUND

Call recording is a popular feature for mobile phone users, for example, for recording conference calls for revisiting the topic of discussion once the call is finished. However, conventional call recording applications are not useful for Dual-Subscriber Identity Module (SIM), Dual-Active (DSDA) wireless communication devices. DSDA wireless communication devices have the capability to have two simultaneously active voice calls. Existing applications, however, do not have the capability to record conversations on both subscriptions simultaneously; they record only the audio of the active conversation.

As a result, when a call recording option is exercised on current DSDA wireless communication devices the conversation is intertwined with voice from both subscriptions as the user switches between them making it difficult for the end user to filter the desired conversation from the recorded audio. Further, the audio conversation of one call will be lost during the time the other is recorded.

In an example of the conventional art, with call recording enabled, a user dials into a conference call on Subscription1 (Sub1) to be recorded for future use. Since both subscriptions are active on a DSDA wireless communication device, the user may receive a call on Subscription2 (Sub2) that must be answered. As a result of the limitations of current call recording applications for DSDA wireless communication devices, if the user answers the call on Sub2 then the conference call on Sub1 will be put on local hold, and for the time that the user is engaged in the call on Sub2, the conference call on Sub1 would not be recorded even though the call is active at the radio layer of the DSDA wireless communication device.

SUMMARY

Systems and methods for recording calls for DSDA wireless communication devices are provided.

According to various embodiments there is provided multi-Subscriber Identity Module (SIM) wireless communication device. The multi-Subscriber Identity Module (SIM) wireless communication device may include: a first communications unit; a second communications unit; a recording unit; and a control unit. The a control unit may be configured to cause the first communications unit to interrupt output of a first audio output to a sound reproduction device signal and conduct a first decoded audio signal to the recording unit. The a control unit may also be configured to cause the second communications unit to output a second audio output signal to the sound reproduction device.

According to various embodiments there is provided an apparatus for call recording on a multi-Subscriber Identification Module (SIM) wireless communication device. The apparatus may include: a recording unit; and a control unit. The control unit may be configured to interrupt output of a first audio output signal to a sound reproduction device and conduct a first decoded audio signal to the recording unit. The control unit may also be configured to cause a second audio output signal to be output to the sound reproduction device.

According to various embodiments there is provided an apparatus for call recording on a multi-Subscriber Identification Module (SIM) wireless communication device. The apparatus may include: means for recording audio signals; and means for controlling configured to interrupt output of a first audio output signal to means for reproducing sound and conduct a first decoded audio signal to said means for recording audio signals. The means for controlling may also be configured to cause a second audio output signal to be output to the means for reproducing sound.

According to various embodiments there is provided a method for call recording on a multi-Subscriber Identification Module (SIM) wireless communication device. The method may include: activating call recording for a first call on a first subscription; putting the first call on local hold; and connecting a second call on a second subscription. The first call may be muted such that an audio signal of the second call is not mixed with the recording of the first call.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide apparatuses and methods for recording calls for DSDA mobile devices. One of ordinary skill in the art will appreciate that the present inventive concept can be applied to multi-SIM mobile devices having multiple radios without departing from the scope of the present inventive concept.

Figure 1:
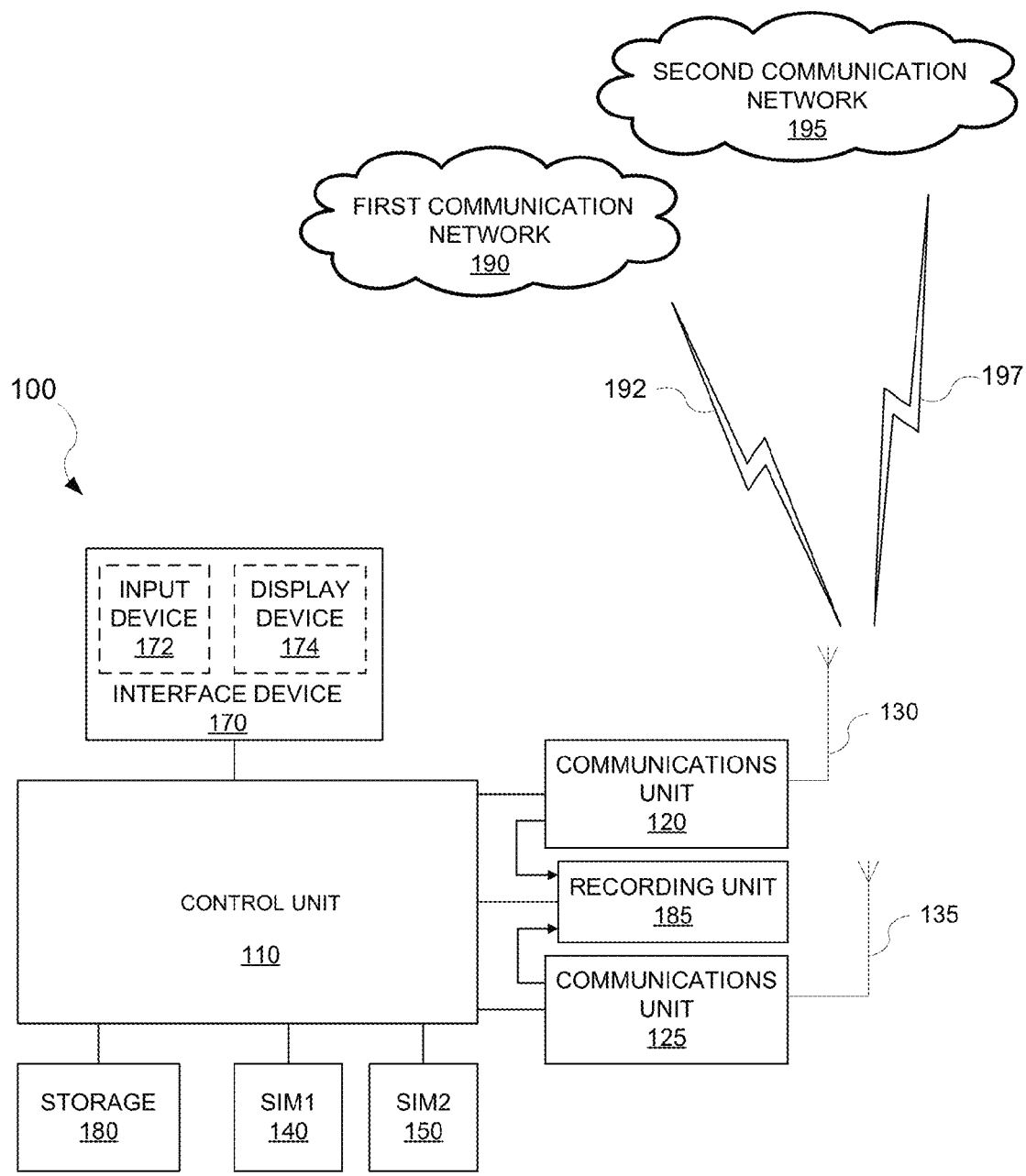
FIG. 1 is a block diagram illustrating a DSDA wireless communication device according to various embodiments.

FIG. 1 is a block diagram illustrating a DSDA wireless communication device 100 according to various embodiments. As illustrated in FIG. 1, the wireless communication device 100 may include a control unit 110, a first communications unit 120, a second communications unit 125, a first antenna 130, a second antenna 135, a first SIM 140, a second SIM 150, a user interface device 170, storage 180, and a recording unit 185.

A SIM (e.g., 140, 150) in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the MSMA communication device, and thus need not be a separate or removable circuit, chip, or card.

A SIM used in various embodiments may store user account information, an IMSI a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 100 may be, for example but not limited to, a mobile telephone, smartphone, tablet, computer, etc., capable of communications with one or more wireless networks. One of ordinary skill in the art will appreciate that the wireless communication device 100 may include one or more transceivers (communication units) and may interface with one or more antennas without departing from the scope of the present inventive concept.

The first SIM 140 may associate the first communications unit 120 with a first subscription (Sub1) 192 on a first communication network 190 and the second SIM 150 may associate the second communications unit 125 with a second subscription (Sub2) 197 on a second communication network 195. For convenience, throughout this disclosure Sub1 is associated with the first communications unit 120 and Sub2 is associated with the second communications unit 125. One of ordinary skill in the art will appreciate that either subscription may be associated with either communications unit without departing from the scope of the present inventive concept.

The recording unit 185 may record audio signals that it receives from the first communications unit 120, the second communications unit 125, or simultaneously from the first communications unit 120 and the second communications unit 125.

The first communication network 190 and the second communication network 195 may be operated by the same or different service providers, and/or may support the same or different communication technologies, for example, but not limited to, CDMA, WCDMA, TDMA, GSM, etc.

The user interface device 170 may include an input device 172, for example, but not limited to a keyboard, touch panel, or other human interface device, and a display device 174, for example, but not limited to, a liquid crystal display (LCD) or other video display. One of ordinary skill in the art will appreciate that other input and display devices may be used without departing from the scope of the present inventive concept.

The control unit 110 may control overall operation of the wireless communication device 100 including, but not limited to, control of the first and second communications units 120, 125, the user interface device 170, and the storage 180. The control unit 110 may be a programmable device, for example, but not limited to, a microprocessor or microcontroller.

The storage 180 may store application programs necessary for operation of the wireless communication device 100 that are executed by the control unit 110, as well as application data and user data.

Figure 2:
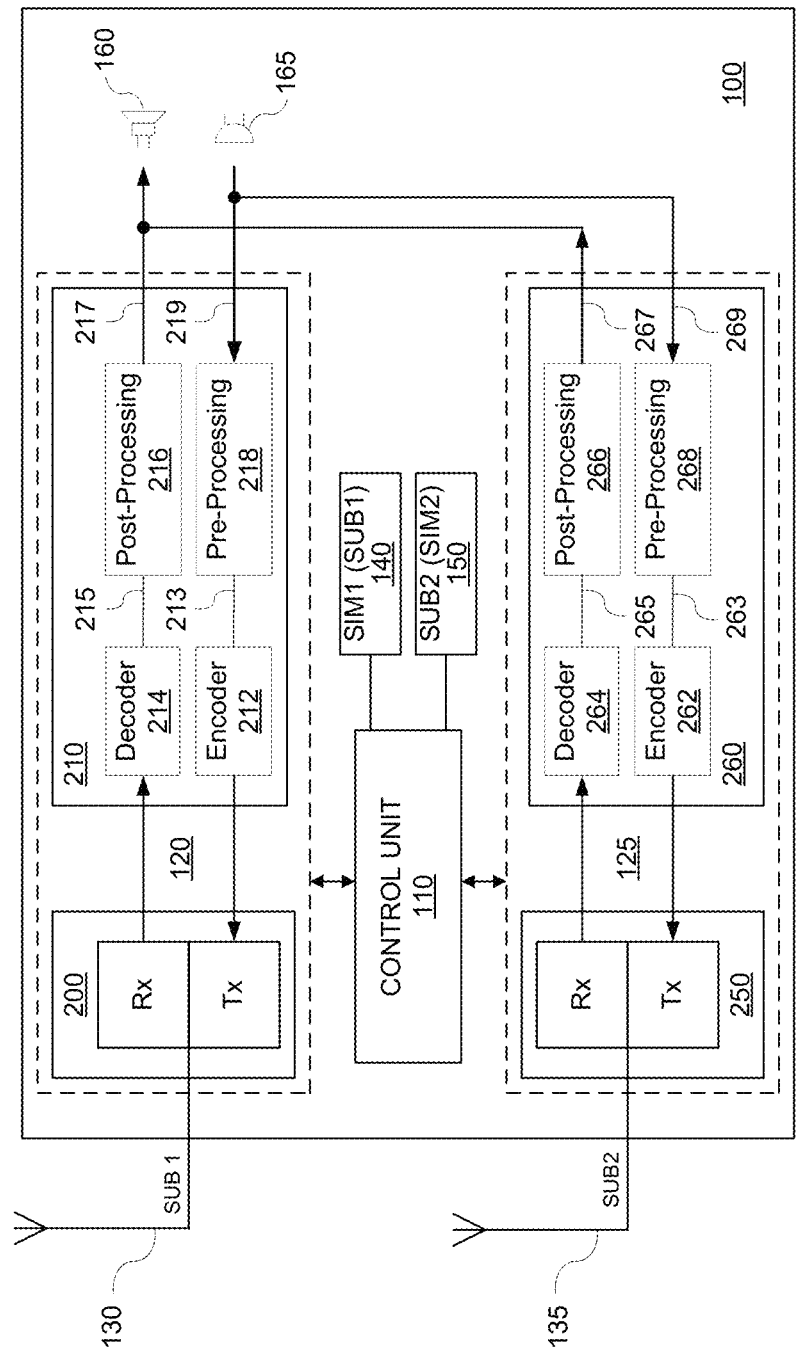
FIG. 2 is a block diagram illustrating first and second communication units according to various embodiments.

FIG. 2 is a block diagram illustrating first and second communication units (e.g., 120, 125 in FIG. 1) according to various embodiments.

With reference to FIGS. 1 and 2, the first communications unit 120 may include a first transceiver 200 that transmits and receives signals on the first antenna 130, and a first modem 210. The first modem 210 may include a first encoder 212 that encodes audio signals for transmission by the first transceiver 200 and a first decoder 214 that decodes audio signals received by the first transceiver 200. The second communications unit 125 may include a second transceiver 250 that transmits and receives signals on the second antenna 135, and a second modem 260. The second modem 260 may include a second encoder 262 that encodes audio signals for transmission by the second transceiver 250 and a second decoder 264 that decodes the audio signals received by the second transceiver 250.

The first communication unit 120 may further include a first post-processing unit 216 that post-processes first decoded audio signal 215 from the first decoder 214 to generate a first audio output signal 217 to a sound reproduction device 160, for example a speaker, that may be included in the wireless communication device 100, and a first pre-processing unit 218 that receives a first audio input signal 219 from an audio input transducer 165, for example a microphone, that may be included in the wireless communication device 100 and pre-processes the first audio input signal 219 to generate a first pre-processed audio signal 213 to be encoded by the first encoder 212. One of ordinary skill in the art will appreciate that the sound reproduction device, speaker, audio input transducer, and/or microphone may be part of an auxiliary device, for example, but not limited to, a wireless headset, a wired headset, etc.

The second communications unit 125 may further include a second post-processing unit 266 that post-processes a second decoded audio signal 265 from the second decoder 264 to generate a second audio output signal 267 to the sound reproduction device 160, and a second pre-processing unit 268 that receives a second audio input signal 269 from the audio input transducer 165 and pre-processes the second audio input signal 269 to generate a second pre-processed audio signal 263 to be encoded by the second encoder 262.

The first post-processing unit 216 and the second post-processing unit 266 may be commonly connected to the audio output transducer 160. The first pre-processing unit 218 and the second pre-processing unit 268 may be commonly connected to the audio input transducer 165.

One of ordinary skill in the art will appreciate that while some embodiments such as described above may incorporate separate decoder, encoder, preprocessor, and postprocessor components for each SIM, in other embodiments the decoder, encoder, preprocessor, and postprocessor components may be the same for both SIMs.

Figure 3:
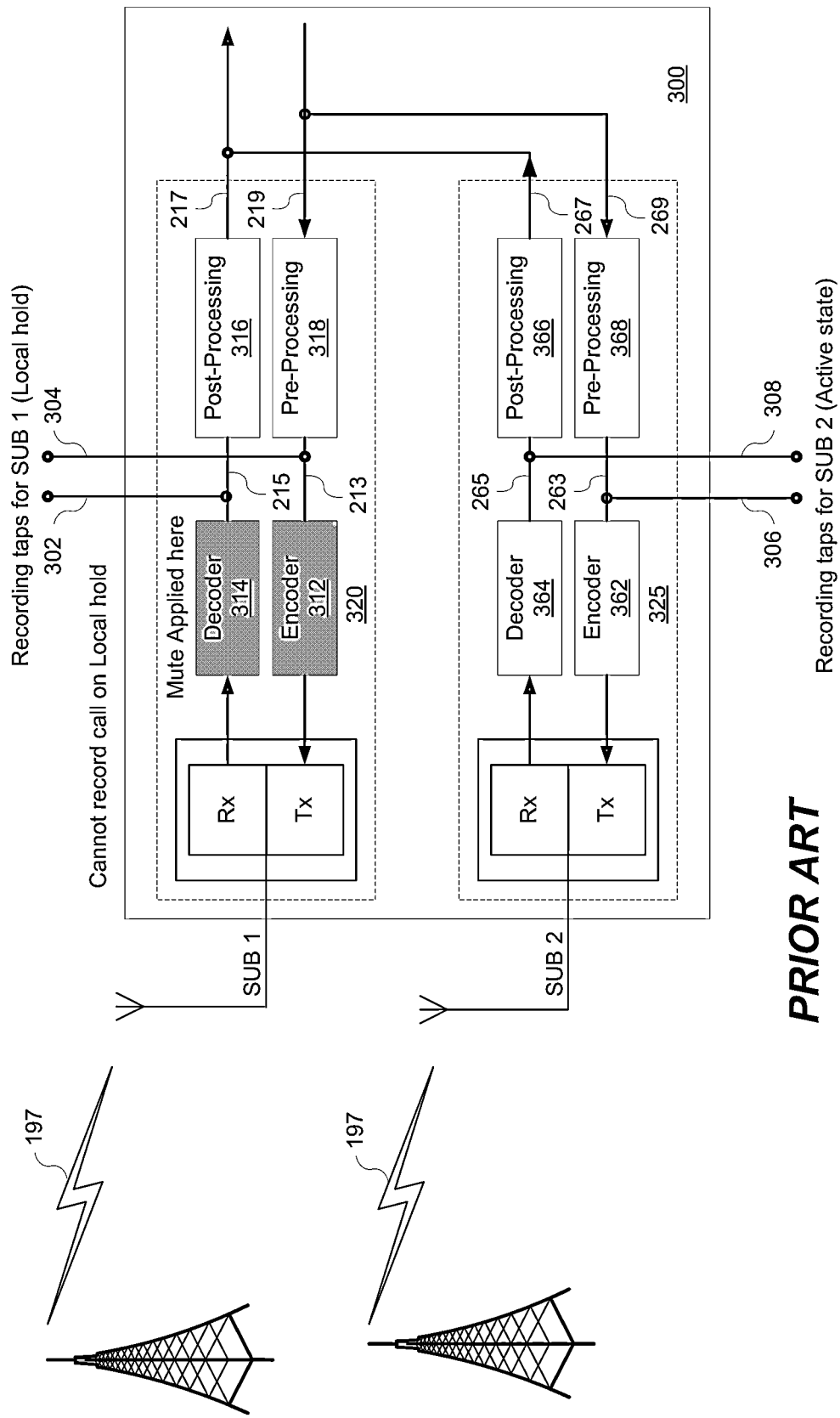
FIG. 3 is a diagram illustrating call muting and recording on a conventional DSDA mobile device.

FIG. 3 is a diagram illustrating call muting and recording on a conventional DSDA wireless communication device 300. Referring to FIG. 3, call recording taps, i.e., points in a signal chain where audio signals are accessed for recording, are provided for a first communications unit 320 and a second communications unit 325. For the first communications unit 320, an incoming call recording tap 302 is located between a first decoder 314 and a first post-processing unit 316 for recording the first decoded audio signal 215 of a call on Sub1 192, and an outgoing call recording tap 304 is located between a first pre-processing unit 318 and a first encoder 312 for recording the first pre-processed audio signal 213 of the call on Sub1 192. Incoming and outgoing call recording taps 308, 306, respectively, for the second communications unit 325 are similarly located in the signal chain of the second communications unit 325 for recording the second decoded audio signal 265 and the second pre-processed audio signal 263 of a call on Sub2 197.

When a call on Sub1 192 is placed on local hold to connect a call on Sub2 197, call muting is applied on Sub1 192 in the transmit/receive stream at the first encoder 312 and first decoder 314. Since the recording tap 302 for the first decoded audio signal 215 of the call on Sub1 192 is located between the first decoder 314 and the first post-processing unit 316, muting the call at the first decoder 314 prevents recording of the first decoded audio signal 215 of the call on Sub1 192 when the call on Sub1 192 is placed on local hold.

Figure 4A:
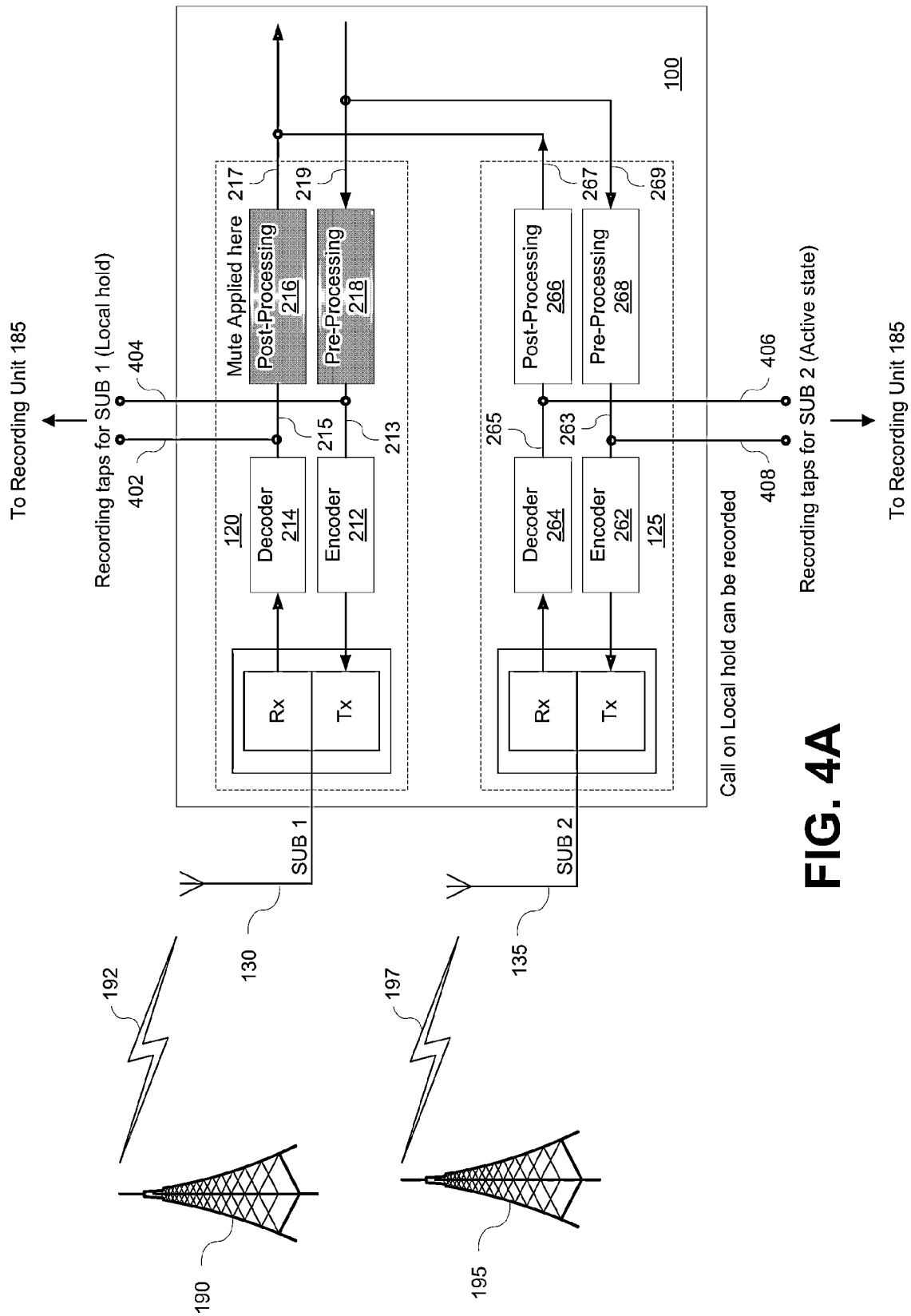
FIG. 4A is a diagram illustrating call muting and recording on a DSDA mobile device according to various embodiments.

FIG. 4A is a diagram illustrating call muting and recording on a wireless communication device (e.g., 100 in FIGS. 1-2) according to various embodiments. With reference to FIGS. 1, 2, and 4A, an incoming call recording tap 402 for the first communications unit 120 is located between the first decoder 214 and the first post-processing unit 216 to conduct the first decoded audio signal 215 of the call on Sub1 192 to the recording unit 185. An outgoing call recording tap 404 for the first communications unit 120 is located between the first pre-processing unit 218 and the first encoder 212 to conduct the first pre-processed audio signal 213 of the call on Sub1 192 to the recording unit 185. The call recording taps 406, 408 for the second communications unit 125 are similarly located in the signal chain of the second communications unit 125 for conducting the second decoded audio signal 265 and the second pre-processed audio signal 263 of calls on Sub2 197 to the recording unit 185.

When a call on Sub1 192 is placed on local hold to connect a call on Sub2 197, the control unit 110 may cause the first post-processing unit 216 to interrupt the first audio output signal 217 of transmit/receive stream for the call on Sub1 192, thereby muting the incoming call on Sub1 192. Therefore, the first decoded audio signal 215 for the Sub1 192 call on local hold may be recorded via the incoming call recording tap 402 while the Sub1 192 call is muted to the user.

Further, the control unit 110 may cause the first pre-processing unit 218 to interrupt the first audio input signal 219 of transmit/receive stream for the call on Sub1 192, thereby muting the outgoing call on Sub1 192. Since the first audio input signal 219 of the call on Sub1 192 are muted at the first pre-processing unit 218, the second audio input signal 263 from the call on the Sub2 197 call will not be mixed via the outgoing call recording tap 404 into the recorded audio on Sub1 192 while the Sub1 192 call is muted to the user.

Figure 4B:
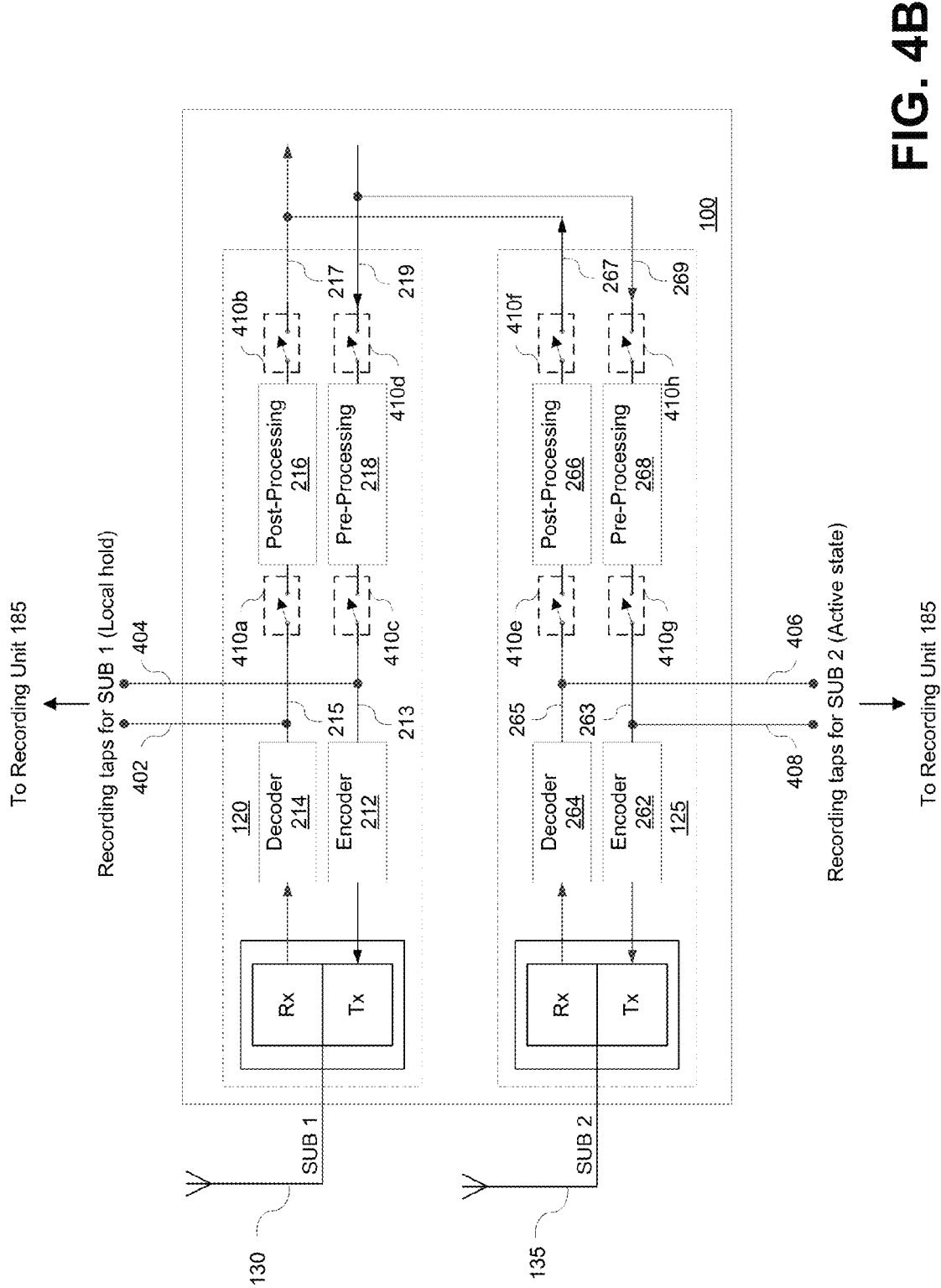
FIG. 4B is a diagram illustrating switches used to implement call muting and recording on a DSDA mobile device according to various embodiments.

FIG. 4B is a diagram illustrating switches used to implement call muting and recording on a wireless communication device (e.g., 100 in FIGS. 1, 2, and 4A) according to various embodiments. Referring to FIGS. 1, 2, and 4B the audio signals may be interrupted by employing switches 410a-410h disposed at the inputs and/or outputs of the first and second post-processing units 216, 266 and at the inputs and/or outputs of the first and second pre-processing units 218, 268. The switches may be, for example, but not limited to, mechanical switches, microelectromechanical (MEM) switches, transistor or other semiconductor switches, etc., configured to operate under control of the control unit 110.

One of ordinary skill in the art will appreciate that a call on Sub2 may be muted and recorded while a second call is in process on Sub1 in a similar manner as described above.

According to various embodiments of the disclosure, both the decoded audio signal and pre-processed audio signal on one subscription may be recorded to a first audio file while the decoded audio signal on the other subscription may be recorded to a second audio file. For example, referring again to FIGS. 1, 2, and 4A-4B, both the first decoded audio signal 215 and the first pre-processed audio signal 213 of a call on Sub1 192 on the first communications unit 120 may be recorded to a first audio file via the incoming and outgoing call recording taps 402, 404, respectively. Simultaneously, the second decoded audio signal 265 of a call on local hold on Sub2 197, for example, but not limited to, a conference call or a presentation, on the second communications unit 125 may be recorded to a second audio file via the incoming call recording tap 408.

Since the call on local hold on Sub2 197 is muted at the second post-processing unit 266 of the second communications unit 125, the second decoded audio signal 265 on the second communications unit 125 may still be decoded and recorded. Further, the second pre-processed audio signal 263 of the call on Sub2 197 is muted at the second pre-processing unit 268 of the second communications unit 125, so any conversation on the call on Sub1 192 on the first communications unit 120 will not be mixed via the outgoing call recording tap 406 into the recorded audio on Sub2 197 on the second communications unit 125.

Figure 5:
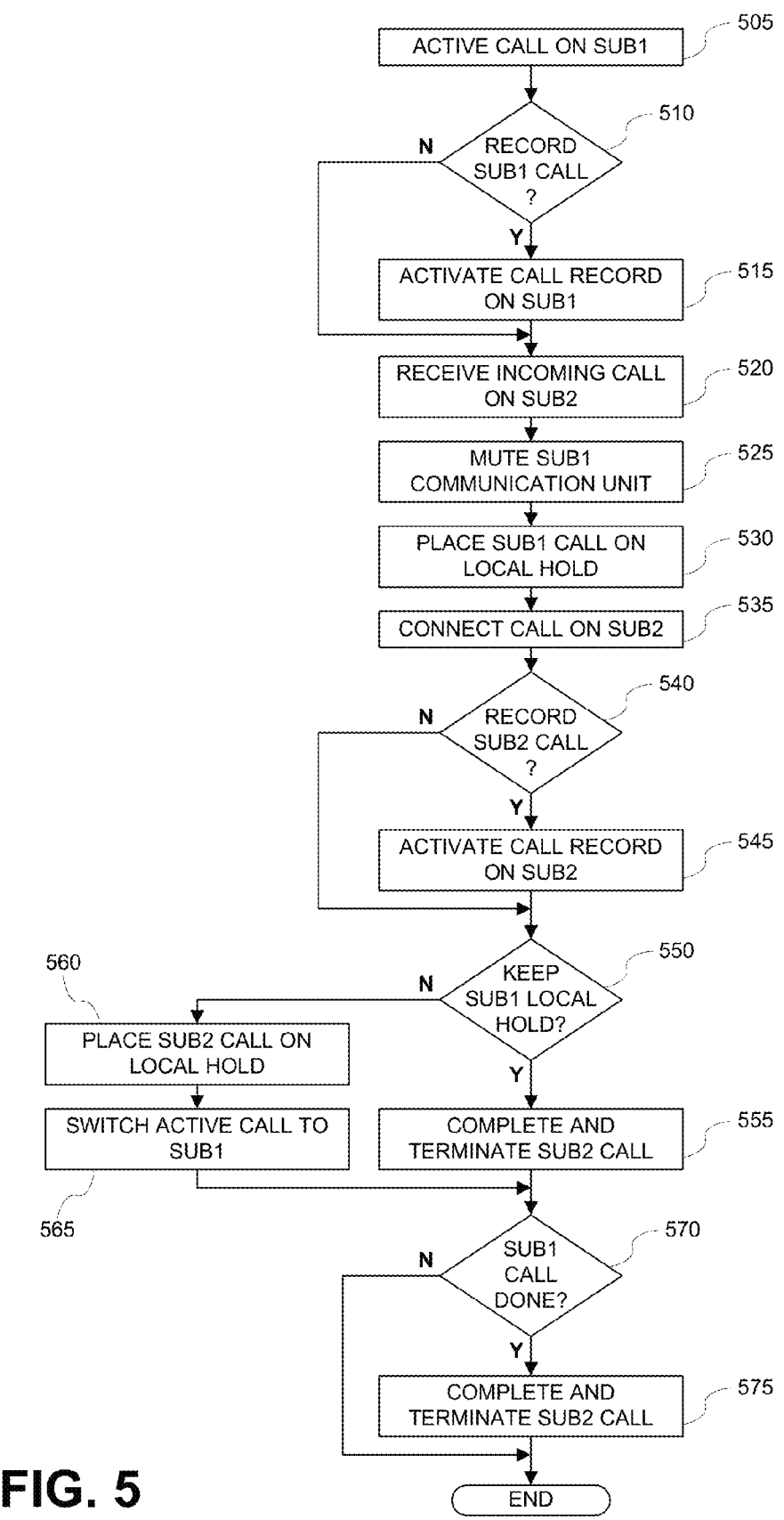
FIG. 5 is a flowchart illustrating a method for recording calls according to various embodiments.

FIG. 5 is a flowchart illustrating a method for recording calls on a wireless communication device (e.g., 100 in FIGS. 1, 2, and 4A-4B) according to various embodiments. With respect to the explanation of the method of FIG. 5, an "active call" refers to a call which is not on local hold. With reference to FIGS. 1, 2, 4A-4B, and 5, during an active call on Sub1 192 (505), a determination may be made as to whether the call on Sub1 192 is to be recorded (510). If the call on Sub1 192 is to be recorded (510-Y), call recording may be activated for the call on Sub1 192 (515) based on call recording options. Otherwise (510-N), Sub1 192 call recording is not activated and a call may be received on Sub2 197 (520).

Various embodiments provide a variety options for call recording. Call recording options may be set as default recording options. For example, call recording may be set as a default to begin at the start of an active call, or call recording may be initiated as a default for a call put on local hold. Additionally or alternatively, call recording options may be called up at any time by input to the input device 172 and displayed as menu options on the display device 174, and/or a call recording menu presenting menu options may be automatically displayed on the display device 174, for example a pop-up menu, when a call is placed or received on either Sub1 192 or Sub2 197. One of ordinary skill in the art will appreciate that other options for setting recording options are possible without departing from the scope of the present inventive concept.

During the active call on Sub1 192 a call may be received on Sub2 197 (520). Muting may be applied to the first post-processing unit 216 and first pre-processing unit 218 of the first communication unit 120 associated with Sub1 192 (525) as described, and the call on Sub1 192 may be placed on local hold (530) to answer the call on Sub2 197. The call on Sub2 197 may be connected (535) and a determination may be made as to whether the call on Sub2 197 is to be recorded (540).

If the call on Sub2 197 is also to be recorded (540-Y), call recording may be activated for the call on Sub2 197 (545) based on additional call recording options. In various embodiments, recording options may be set to simultaneously record audio signals from Sub1 192 and Sub2 197 as separate audio files. Incoming and outgoing audio signals for an active call on Sub1 192 may be recorded to a first file, while only the incoming audio signal for a call on local hold on Sub2 197 may be recorded in a second file. In various embodiments, audio signals from Sub1 192 and Sub2 197 may be recorded to one audio file, for example, during a 3-way conversation.

If the call on Sub2 197 is not to be recorded (540-N) or call recording is activated for the call on Sub2 197 (545), a determination may be made as to whether the call on Sub1 192 is to remain on local hold (550). If the call on Sub1 192 is to remain on local hold (550-Y), the active call on Sub2 197 is completed and then terminated (555). Otherwise (550-N), the call on Sub2 197 is placed on local hold (560) and the active call is switched to the call on Sub1 192 (565).

If the call on Sub1 192 has not yet been completed (570-N), the active call on Sub1 192 is completed and then terminated (575).

The accompanying claims and their equivalents are intended to cover such forms or modifications as would fall within the scope and spirit of the protection. For example, the example apparatuses, methods, and systems disclosed herein can be applied to DSDA and multi-SIM wireless communication devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

One of ordinary skill in the art will appreciate that the present inventive concept applies to muting and recording calls on both communications units of DSDA wireless communication devices and to multiple communications units of multi-SIM wireless communication devices.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A multi-Subscriber Identity Module (SIM) wireless communication device, comprising:
a first communications unit;
a second communications unit;
a recording unit; and
a control unit configured to cause the first communications unit to interrupt output of a first audio output signal to a sound reproduction device and conduct a first decoded audio signal to the recording unit; and
the control unit configured to cause the second communications unit to output a second audio output signal to the sound reproduction device,
wherein the first communications unit includes:
a first recording tap disposed at an input of a first post-processing unit, the first recording tap configured to conduct the first decoded audio signal to the recording unit; and a second recording tap disposed at an output of a first pre-processing unit, the second recording tap configured to conduct a first pre-processed audio signal that is output by the first pre-processing unit to the recording unit, and wherein:
the control unit is configured to cause the first post-processing unit to interrupt output of the first audio output signal and cause the recording unit to record the first decoded audio signal via the first recording tap; and the control unit is configured to cause the first pre-processing unit to interrupt a first audio input signal to prevent recording of the first audio input signal.

2. The multi-SIM wireless communication device according to claim 1, wherein:
the first communications unit is associated with at least one of a first SIM and a first subscription, and
the second communications unit is associated with at least one of a second SIM different from the first SIM and a second subscription different from the first subscription.

3. The multi-SIM wireless communication device according to claim 1, wherein:
the control unit is configured to cause the first communications unit to interrupt output of the first audio output signal and cause the recording unit to record the first decoded audio signal; and
the control unit is configured to cause the first communications unit to interrupt a first audio input signal to prevent recording of the first audio input signal.

4. The multi-SIM wireless communication device according to claim 1, wherein:
the control unit is configured to cause the first communications unit to interrupt output of the first audio output signal and cause the recording unit to record the first decoded audio signal;
the control unit is configured to cause the first communications unit to interrupt a first audio input signal to prevent recording of the first audio input signal; and
the control unit is configured to cause the recording unit to record the first decoded audio signal, record a second decoded audio signal, and record a second pre-processed audio signal from the second communications unit.

5. The multi-SIM wireless communication device according to claim 1, wherein the second communications unit comprises:
a third recording tap disposed at an input of a second post-processing unit, the third recording tap configured to conduct a second decoded audio signal to the recording unit; and
a fourth recording tap disposed at an output of a second pre-processing unit, the fourth recording tap configured to conduct a second pre-processed audio signal that is output by the second pre-processing unit to the recording unit.

6. The multi-SIM wireless communication device according to claim 5, wherein:
the control unit is configured to cause the first post-processing unit to interrupt output of the first audio output signal and cause the recording unit to record the first decoded audio signal via the first recording tap;
the control unit is configured to cause the first pre-processing unit to interrupt the first audio input signal to prevent recording of the first audio input signal; and
the control unit is configured to cause the recording unit to record the first decoded audio signal via the first recording tap, record the second decoded audio signal via the third recording tap, and record the second pre-processed audio signal from the second pre-processing unit via the fourth recording tap.

7. The multi-SIM wireless communication device according to claim 6,
wherein the control unit is configured to cause the recording unit to record the decoded audio signal via the first recording tap in a first data file; and
wherein the control unit is configured to cause the recording unit to record the second decoded audio signal via the third recording tap and the second pre-processed audio signal via the fourth recording tap in a second data file.

8. The multi-SIM wireless communication device according to claim 6,
wherein the control unit is configured to cause the recording unit to record the decoded audio signal via the first recording tap in a first data file; and
wherein the control unit is configured to cause the recording unit to record the second decoded audio signal via the third recording tap and the second pre-processed audio signal via the fourth recording tap in the first data file.

9. The multi-SIM wireless communication device according to claim 1, wherein the sound reproduction device comprises a speaker.

10. An apparatus for call recording on a multi-Subscriber Identification Module (SIM) wireless communication device, the apparatus comprising:
a recording unit;
a control unit configured to interrupt output of a first audio output signal to a sound reproduction device and conduct a first decoded audio signal to the recording unit, and cause a second audio output signal to be output to the sound reproduction device; and
a first communications unit including:
a first decoder configured to generate the first decoded audio signal;
a first post-processing unit configured to process the first decoded audio signal to generate the first audio output signal;
a first pre-processing unit configured to process a first audio input signal to generate a first pre-processed audio signal;
a first encoder configured to encode the first pre-processed audio signal; and
a second recording tap disposed between the first pre-processing unit and the first encoder, the second recording tap configured to conduct the first pre-processed audio signal to the recording unit.

11. The apparatus according to claim 10, wherein the recording unit is configured to record the first decoded audio signal.

12. The apparatus according to claim 10, wherein the first communications unit is associated with at least one of a first SIM and a first subscription.

13. The apparatus according to claim 10, wherein the first communications unit further comprises a first recording tap disposed between the first decoder and the first post-processing unit, the first recording tap configured to conduct the first decoded audio signal to the recording unit.

14. The apparatus according to claim 13, wherein the control unit is further configured to cause the first post-processing unit to interrupt the first audio output signal.

15. The apparatus according to claim 10, wherein the control unit is further configured to cause the first pre-processing unit to interrupt the first audio input signal.

16. The apparatus according to claim 10, wherein the sound reproduction device comprises a speaker.

17. An apparatus for call recording on a multi-Subscriber Identification Module (SIM) wireless communication device, the apparatus comprising:
  means for recording audio signals;
  means for controlling configured to interrupt output of a first audio output signal to means for reproducing sound and conduct a first decoded audio signal to said means for recording audio signals, and to cause a second audio output signal to be output to the means for reproducing sound;
  means for communication including:
    means for decoding configured to generate the first decoded audio signal;
    means for post-processing configured to process the first decoded audio signal to generate the first audio output signal;
    means for pre-processing configured to process a first audio input signal to generate a first pre-processed audio signal;
    means for encoding configured to encode the first pre-processed audio signal; and
  a recording tap disposed between the means for pre-processing unit and the means for encoding, the recording tap configured to conduct the first pre-processed audio signal to the means for recording audio signals.

* * * * *